May 16, 1967  J. JONES-HINTON ET AL  3,319,295
SHAPED ARTICLES
Original Filed Oct. 2, 1961  2 Sheets-Sheet 1
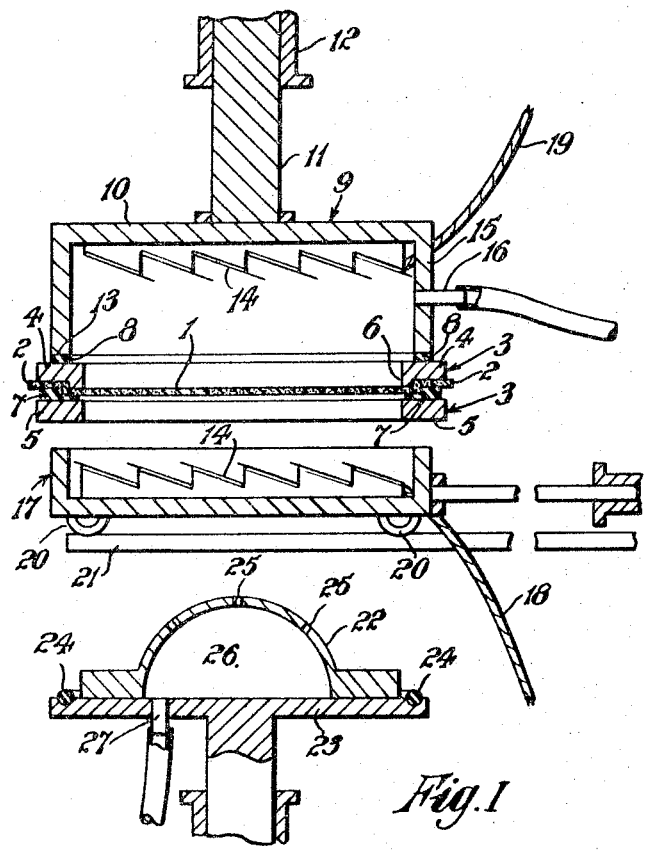
Fig. I
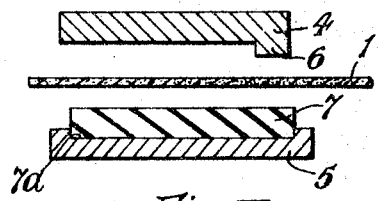
Fig. III
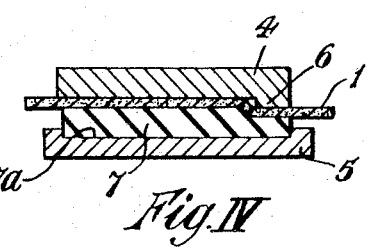
Fig. IV
Inventors
James Jones-Hinton
Thomas E. H Gray
By Stevens, Davis, Miller & Mosher
Attorneys

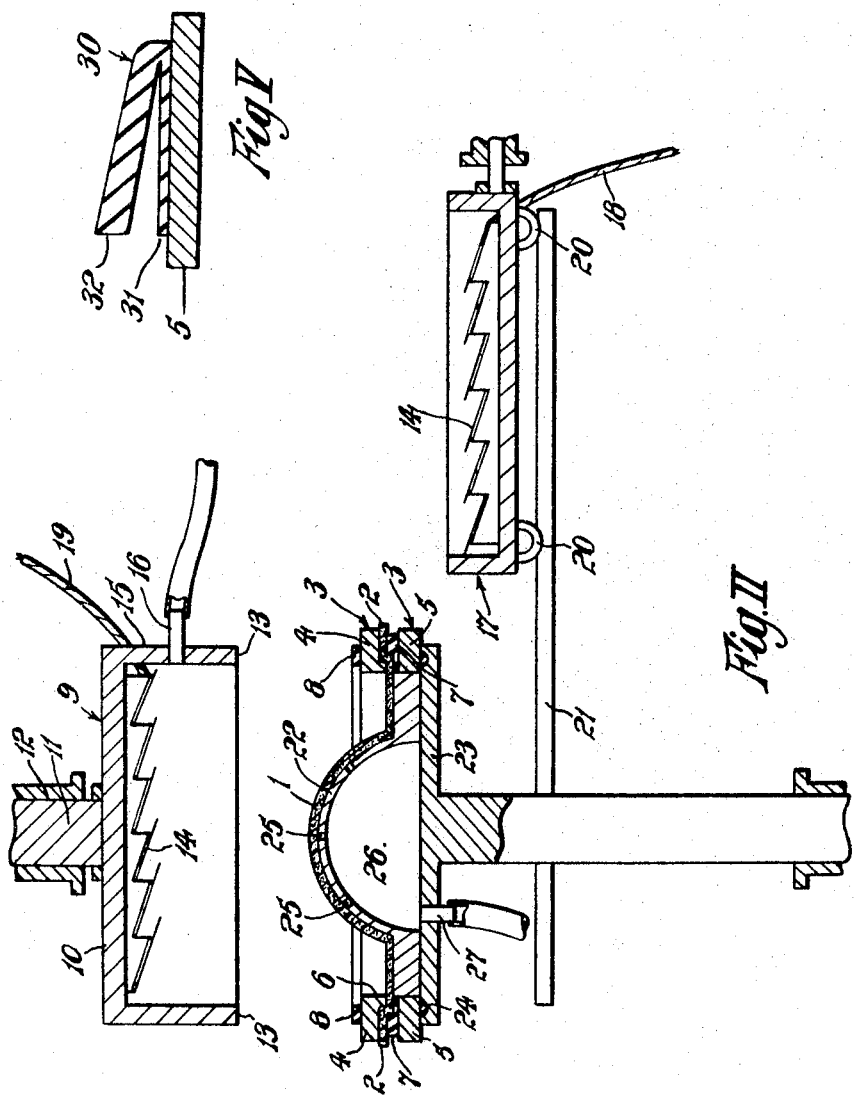

3,319,295
SHAPED ARTICLES

James Jones-Hinton, Solihull, and Thomas E. H. Gray, Sutton Coldfield, England, assignors to Dunlop Rubber Company Limited, London, England, a British company Original application Oct. 2, 1961, Ser. No. 142,111, now Patent No. 3,207,821. Divided and this application Apr. 29, 1965, Ser. No. 451,770

Claims priority, application Great Britain, Oct. 21, 1960, 36,090/60; Jan. 19, 1961, 2,150/61

4 Claims. (Cl. 18—19)

This application is a division of applicants' U.S. patent application Ser. No. 142,111, filed Oct. 2, 1961.

This invention relates to improvements in the manufacture of shaped articles and more particularly in the method known as vacuum forming.

Forming shaped articles from sheets of thermoplastic material by the method of vacuum forming is brought about by arranging for a sheet of the material clamped around its edge and softened by the application of heat to be pressed intimately against a shaping former by withdrawing the air from the space between the sheet and shaping former. It has been found that the sheet tends to sag whilst being heated prior to shaping and this is disadvantageous, since articles formed from such sheets are often faulty and must be rejected. Therefore, there is a need for a method of heating sheets in which the tendency to sag is reduced.

According to the invention, a method of shaping a sheet of thermoplastic material by the method of vacuum forming includes the step of softening the sheet by heating and reducing the pressure on the upper surface of the sheet, whereby the sheet is retained in substantially-planar configuration as it softens.

The invention also includes a method of shaping a sheet of thermoplastic material which comprises securely clamping the sheet in clamping means, heating the sheet and reducing the pressure of the upper surface thereof to maintain the sheet in substantially-planar configuration as it softens, bringing a shaping former adjacent one surface of said sheet when soft and evacuating the space between said soft sheet and said shaping former to cause said sheet to conform to the profile of said former and allowing the shaped sheet to cool and set.

In the method of softening a sheet of thermoplastic material according to the invention, the difference in pressure between the upper surface and the lower surface of the sheet brought about when the pressure on the upper surface is reduced, is such that any tendency of the sheet to sag as it is softening is counteracted and kept to a minimum. Generally, the difference in pressure per unit area of sheet is of the order of the weight per unit area of the sheet. It may be necessary to vary the reduction in pressure as the sheet softens to maintain the sheet in substantially-planar configuration.

The method of softening sheet material according to the invention is advantageous in that sagging of the sheet whilst being softened is greatly reduced and also uniform heating of the sheet is possible. The method is particularly advantageous when large sheets of thermoplastic material are to be softened. The possibility of sagging is increased with large sheets and rejection of faulty articles is an expensive procedure. Large sheets can now be softened with very little possibility of sagging taking place and the method is quickly and easily incorporated into the cycle of operations of existing vacuum forming apparatus.

During operation of the method in accordance with the invention, it is necessary to clamp the sheet securely around its periphery to retain the sheet in the desired position and also to prevent the ingress of air while the sheet is being heated and subsequently during vacuum forming. This is of particular importance when large sheets are being shaped due to the large force required to effect secure clamping and also due to the variations in thickness which can occur in large sheets.

Therefore, the invention also includes means to clamp the sheet to be shaped by the method of the invention comprising a composite framework having two members adapted to fit around the periphery of the sheet, one member having a resilient strip of rubber or rubber-like material on one surface, the other member having an abutment on one surface, and means to retain the two members closely adjacent whereby the sheet is retained between the two members by the said abutment and said resilient strip.

In its most usual form the clamping means comprises two rectangular metal frames or members adapted to fit one on each side of the sheet adjacent its edge. The member contacting the upper surface of the sheet is provided with an abutment on its lower surface at its inner periphery while the lower member is provided with the resilient strip, preferably located in a groove, around its upper surface. As the two members are urged together, the sheet is held securely between the resilient strip and the lower surface of the upper member and around the abutment, in the recess formed in the resilient strip by deformation by the abutment. The resilience of the strip of rubber or rubber-like material should be such that it will return to its natural shape when the two members are withdrawn from the sheet after deformation of the strip by the abutment. The abutment should be of such a size that it causes the sheet to bend slightly so that when the sheet is being softened and subsequently shaped, the force upon the sheet tending to pull its outer periphery inwards, produces a shearing or dragging of the resilient strip which, in turn, produces a locking force at the abutment. The larger the tension in the sheet, the larger is this locking force and so the sheet is prevented from contracting inwards and is securely clamped at its outer periphery.

One method of softening a sheet of thermoplastic material and subsequently shaping the softened sheet into an article according to the invention, will now be described by way of example, with reference to the accompanying drawing, in which:

FIGURE I is a diagrammatic cross-section of the apparatus employed during softening the sheet, FIGURE II is a diagrammatic cross-section of the apparatus during shaping of the sheet, FIGURES III and IV are diagrammatic part-views of the clamping means, and FIGURE V is a part-view of an alternative form of the clamping means.

A sheet 1 of polypropylene having a size of approximately 8 ft. x 4 ft. and a weight of 2 lbs. per square foot, is placed in a vacuum forming machine and the edges 2 of the sheet 1 are clamped in a composite framework 3.

The composite framework 3 consists of two rectangular metal frames 4, 5 one 4 of which is formed from metal plates having an L-shaped cross-section with one of the limbs 6 being much shorter than the other and, in fact, constituting the abutment. The frame 4 forms the upper frame of its short limb 6 extending downwardly at its inner periphery. The upper frame 4 has an external periphery slightly less in size than the sheet 1 and each metal plate constituting the sides of the frame may have a width of from 4 to 12 inches and a thickness of about 1 inch depending on the size of the sheet to be shaped.

The other rectangular metal frame 5 forms the lower frame and is formed from metal plates having a rectangular cross-section with a width slightly larger than those used for the upper frame 4 but a similar thickness. A strip 7 of rubber is secured around the upper surface of the lower frame 5 in a groove 7a. Normally the lower frame 5 will be secured to, or formed integral with, some part of the vacuum forming machine and so constitutes a supporting member for the sheet.

The sheet 1 of thermoplastic material to be softened and subsequently shaped, is placed so as to rest upon the strip 7 of rubber and with its outer periphery outwardly of the strip 7 of rubber. The upper frame 4 is placed in position above the sheet and the two frames 4, 5 are retained closely-adjacent by means of members hingedly connected to a part of the vacuum forming apparatus, or by some other means. The sheet 1 is deformed by the short limb 6 of the frame 4 as the two frames are brought together and is urged into intimate contact with the surface of the upper frame 4 and the rubber strip 7, the deformation being accommodated by the rubber strip 7. The sheet is therefore prevented from moving inwardly.

A seal 8 consisting of a strip of heat-resistant elastomeric material is placed around the upper surface of the upper frame 4. Examples of suitable materials for use as the seal 8 are silicone rubber, polyurethane, or neoprene rubber.

An upper heating unit 9 consisting of a vertically movable rectangular box 10 mounted on a vertical plunger 11 in a cylinder 12 and having an open lower side is then lowered over the sheet 1 so that its free edges 13 make an airtight seal with the upper frame 4 through the strip 8 of elastomeric material. The box 10 contains electrical heating elements 14 which are positioned across the box and above the sheet 1. One side 15 of the box 10 is provided with an outlet tube 16 through which the interior of the box 10 can be evacuated.

A lower heating unit 17 consisting of a series of electrical heating elements 14 similar to those in the upper heating unit 9 is positioned below the sheet material and both heating units connected to a power supply by cables 18, 19 and switched on. In the heating units 9, 17, the heating elements 14 are arranged in side-by-side and overlapping relationship with a gap being formed between the elements in the region of overlap. These heating elements and, in particular, a heater containing such elements from the subject of our copending U.K. patent application No. 6,605/61. The elements 14 uniformly heart the sheet 1 to bring about softening thereof.

The lower heating unit 17 is mounted by means of wheels 20 on rails 21 and can be rolled away from below the sheet 1.

As the sheet 1 is softened, the pressure on the upper side of the sheet 1 is reduced by withdrawing air from within the rectangular box 10 through the outlet tube 16 using a vacuum pump until a drop in pressure of about 2 lbs. per square foot is achieved. Any tendency for the sheet to sag whilst being heated is counteracted by this means.

When the sheet 1 is sufficiently soft the lower heating unit 17 is removed by rolling on rails 21 and a shaping former 22 mounted on a piston 23 is raised upwards into close proximity to the under-surface of the sheet 1 so that the piston is sealed air-tightly by means of seal 24 with the lower frame 5. The shaping former 23 has the form of an upturned hull of a small boat and is provided with vents 25 passing through the surface of the former and is hollow. The upper heating unit 9 is then lifted away from the sheet material thereby breaking the air-tight seal between the lower edges 13 of the rectangular box 10 and clamping means. The shaping former 22 is moved upwards so that the soft sheet 1 is brought into contact with the shaping surface and air is withdrawn from the interior 26 of the former 22 through a vent 27 in the piston surface. The sheet 1 is therefore pressed into intimate contact with the shaping surface and any air which could become trapped between the sheet 1 and former 22 escapes to the interior 26 thereof through the vents 25 in the former 22. This is shown in FIGURE II.

After the sheet 1 has been allowed to cool and set a hull of a boat can be separated from the former 22. The hull has substantially a constant thickness through its structure and very few flaws, if any.

The clamping means for the sheet 1 are shown in more detail in FIGURES III and IV. FIGURE III shows the upper frame 4, sheet 1 and lower frame 5 carrying the rubber strip 7 in groove 7a before clamping is effected. FIGURE IV shows how the sheet 1 is deformed by the short limb 6 of the upper frame 4 to effect secure clamping.

The strip 7 of rubber or rubber-like material may be secured to the upper surface of the lower frame 5 in the groove 7a by a suitable adhesive, although in certain cases it may simply be held on the frame and retained in position by the means retaining the two members closely adjacent the surface of the sheet. The rubber or rubber-like material used to form the strip can comprise natural or synthetic rubber of any known type, provided that it has sufficient resilience to return to its original shape after deformation by the abutment.

In an alternative type of clamping means shown in FIGURE V the strip of rubber 30 has a V-shaped cross-section with one of the limbs 31 having a smaller thickness than the other 32 and this thinner limb 31 being secured to the lower frame 5 so that the open end of the strip is directed outwardly of the sheet.

Whilst the sheet is being softened by the application of heat it is often advisable to continually withdraw air from above the sheet after reducing the pressure to the desired level. Continually withdrawing air in this manner counteracts any increase in pressure which can take place due to an increase in temperature and the air can be withdrawn using a small vacuum pump or using a vacuum bleed attachment to a vacuum reservoir. It is also possible to arrange a control system to automatically switch on the vacuum pump if the sheet should sag below a certain limit as it is being heated. For instance, the sheet can be made to break the beam of a photoelectric cell and thereby cause an electrical relay to bring the pump into operation.

The method of forming shaped articles according to the invention can be carried out using a wide variety of shaping formers, and although it is usual for such formers to be mounted on a movable piston, they can be rigidly placed if desired and the softened sheet material moved into contact with them. Typical articles which can be manufactured from the softened sheet material are ships' hulls, dishes, buckets, plates, ash-trays and other articles which are normally produced by vacuum forming.

Any thermoplastic material which can be obtained in sheet form can be softened and shaped according to the present invention. Typical examples of the thermoplastic material are plasticised or unplasticised vinyl resins, polyolefines such as polyethylene and polypropylene, and polyacrylates.

What is claimed is:

1. Apparatus for vacuum forming a sheet of thermoplastic material comprising a peripheral clamp to hold the sheet in a molding position, an open sided box-like member positioned above said clamp for movement to and from said clamp, means for moving said box-like member to and from a position whereby said box-like member sealingly engages said clamp to form an evacuable enclosure, electrical heating means disposed within said box-like member for heating said sheet during said engagement, means for lowering the pressure within said box-like member during said engagement, a shaping former positioned adjacent said clamp for movement to and from said sheet, and means for moving said shaping former to and from forming contact with said sheet.

2. Apparatus according to claim 1, further comprising an additional heater positioned below said clamp for movement to and from said clamp, and means for moving said additional heater from and to a non-heating position to and from a sheet heating position immediately below said sheet.

3. Apparatus according to claim 1, wherein said means for moving said shaping former is positioned below the sheet so that the shaping former is moved into forming contact with the lower surface of the sheet.

4. Apparatus according to claim 1, wherein said clamp comprises two clamping members forming a composite framework, said members being shaped to fit around the periphery of the sheet, one on each side of the sheet, a strip of resilient material disposed on one surface of one of said members to contact said sheet, an abutment on one surface of the other of said members to contact the sheet, and means to retain the two members in clamping engagement with the sheet.

References Cited by the Examiner

UNITED STATES PATENTS

| | | | |
|---|---|---|---|
| 2,230,189 | 1/1941 | Ferngren | 18—19 |
| 2,694,227 | 11/1954 | Fordyce et al. | 18—19 XR |
| 2,702,411 | 2/1955 | Winstead | 18—19 XR |
| 2,814,074 | 11/1957 | Butzko | 18—19 |
| 2,989,780 | 6/1961 | Zimmerman | 18—19 |
| 3,007,206 | 11/1961 | Griswold. | |
| 3,025,566 | 3/1962 | Kostur | 18—19 |
| 3,060,507 | 10/1962 | Knowles. | |
| 3,072,964 | 1/1963 | Tilden | 18—19 |
| 3,084,389 | 4/1963 | Doyle | 18—19 |
| 3,130,451 | 4/1964 | Morse | 18—19 |
| 3,133,314 | 5/1964 | Arnould et al. | 18—19 |
| 3,153,813 | 11/1964 | Swick | 18—19 |
| 3,161,915 | 12/1964 | Thiel | 18—19 |

FOREIGN PATENTS

| | | |
|---|---|---|
| 1,158,122 | 6/1958 | France. |
| 741,040 | 11/1965 | Great Britain. |

WILLIAM J. STEPHENSON, *Primary Examiner.*